US011361732B2

(12) United States Patent
Ito

(10) Patent No.: US 11,361,732 B2
(45) Date of Patent: Jun. 14, 2022

(54) IMAGE DISPLAY APPARATUS, CONTROL METHOD FOR IMAGE DISPLAY APPARATUS, AND STORAGE MEDIUM

(71) Applicant: CANON KABUSHIKI KAISHA, Tokyo (JP)

(72) Inventor: Chie Ito, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/040,197

(22) Filed: Jul. 19, 2018

(65) Prior Publication Data
US 2019/0027117 A1  Jan. 24, 2019

(30) Foreign Application Priority Data
Jul. 24, 2017  (JP) .............................. JP2017-142968

(51) Int. Cl.
G09G 5/14 (2006.01)
G06F 3/14 (2006.01)
G09G 5/36 (2006.01)
G06F 3/048 (2013.01)
G06F 3/041 (2006.01)
G06F 3/147 (2006.01)

(52) U.S. Cl.
CPC ............... *G09G 5/14* (2013.01); *G06F 3/048* (2013.01); *G06F 3/0412* (2013.01); *G06F 3/14* (2013.01); *G06F 3/147* (2013.01); *G09G 5/36* (2013.01)

(58) Field of Classification Search
CPC combination set(s) only.
See application file for complete search history.

(56) References Cited

U.S. PATENT DOCUMENTS

2011/0055765 A1* 3/2011 Neubrand .......... H04N 1/32122
715/838
2012/0036432 A1* 2/2012 Mizoguchi ............ G06F 3/1256
715/274
2012/0121235 A1* 5/2012 Terasaki ............... G11B 27/105
386/241

FOREIGN PATENT DOCUMENTS

JP  2006-301867 A  11/2006
JP  2007-267362 A  10/2007
JP  2008-054232 A   3/2008

OTHER PUBLICATIONS

Image display device Nakazawa Shinsuke 2006-301867 Feb. 11, 2006 (Year: 2006).*

* cited by examiner

*Primary Examiner* — Van N Chow
(74) *Attorney, Agent, or Firm* — Canon U.S.A., Inc. IP Division

(57) ABSTRACT

An image display apparatus includes a generation unit and a display unit. The generation unit is configured to generate display images one by one from pieces of image data. The display unit is configured to display the display images generated by the generation unit as a list of the pieces of image data. Before generation of a first display image which the generation unit has started to generate using first image data is completed, the generation unit starts to generate a second display image using second image data, according to a predetermined condition.

20 Claims, 13 Drawing Sheets

FIG.8

IMAGE DISPLAY APPARATUS, CONTROL METHOD FOR IMAGE DISPLAY APPARATUS, AND STORAGE MEDIUM

BACKGROUND OF THE INVENTION

Field of the Invention

Aspects of the embodiments generally relate to an image display apparatus, a control method for an image display apparatus, and a storage medium.

Description of the Related Art

There is an image display apparatus which prints an image using image data selected by a user from among pieces of image data stored in a memory of the image display apparatus or pieces of image data stored in a universal serial bus (USB) memory connected to the image display apparatus. To enable the user to select image data to be printed, such an image display apparatus can display, on a display thereof, thumbnail images generated from pieces of image data stored in the memory of the image display apparatus or the USB memory in list form. The user is allowed to select image data to be printed while viewing the thumbnail images displayed in list form, and is thus allowed to select image data to be used for printing while confirming the content of each piece of image data.

Japanese Patent Application Laid-Open No. 2006-301867 discusses an image display apparatus which, in a case where N document files are stored in a memory, generates thumbnail images in order from the leading document file and displays the thumbnail images in sequence. The image display apparatus discussed in Japanese Patent Application Laid-Open No. 2006-301867 generates a thumbnail image of the first document file and displays the generated thumbnail image on a display and, after that, starts generating a thumbnail image of the next document file. The image display apparatus repeats this processing up to the N-th document file, thus displaying thumbnail images of the N document files on the display.

However, in some cases, image data which requires a long time to generate a thumbnail image to be displayed on the display due to, for example, the file format of the image data may be included in pieces of image data stored in the memory. In a case where image data from which the image display apparatus has started to generate a thumbnail image is image data which requires a long time to generate a thumbnail image, the image display apparatus only starts to generate a next thumbnail image after completing generation of the thumbnail image which is being generated. Therefore, when wanting to view a next thumbnail image, the user has to wait for completion of generation of the thumbnail image which is being generated.

SUMMARY OF THE INVENTION

According to an aspect of the embodiments, an image display apparatus includes a generation unit and a display unit. The generation unit is configured to generate display images one by one from pieces of image data. The display unit is configured to display the display images generated by the generation unit as a list of the pieces of image data. Before generation of a first display image which the generation unit has started to generate using first image data is completed, the generation unit starts to generate a second display image using second image data, according to a predetermined condition.

Further features of the disclosure will become apparent from the following description of exemplary embodiments with reference to the attached drawings.

BRIEF DESCRIPTION OF THE DRAWINGS

FIG. 8 is a diagram illustrating an example of a "media print setting" screen which is displayed on the operation unit in the exemplary embodiment.

DESCRIPTION OF THE EMBODIMENTS

Hereinafter, an exemplary embodiment of an image display apparatus to which the disclosure is applied will be described with reference to the drawings. However, constituent elements described in this exemplary embodiment are taken as mere examples, and the scope of the disclosure should not be construed to be limited to those. Moreover, not all of the combinations of constituent elements described in the exemplary embodiment are necessarily essential for solving the issues.

Figure 1:
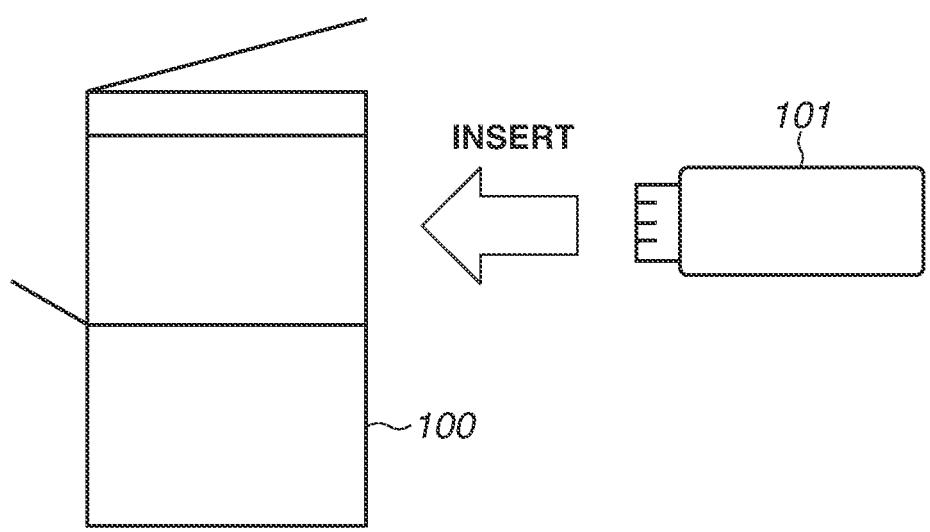
FIG. 1 is a diagram illustrating an example of a system configuration according to an exemplary embodiment.

FIG. 1 illustrates an example of a system configuration according to the present exemplary embodiment. An image display apparatus 100 according to the present exemplary embodiment is able to be connected to a universal serial bus (USB) memory 101. The USB memory 101 is a storage device in which image data that is able to be printed by the image display apparatus 100 is stored, and the user can insert the USB memory 101 into the image display apparatus 100 to use the image data stored in the USB memory 101. The user can operate the image display apparatus 100 to cause a preview image of image data stored in the USB memory 101 to be displayed on a display of the image display apparatus 100 or to issue an instruction for printing an image.

Figure 2:
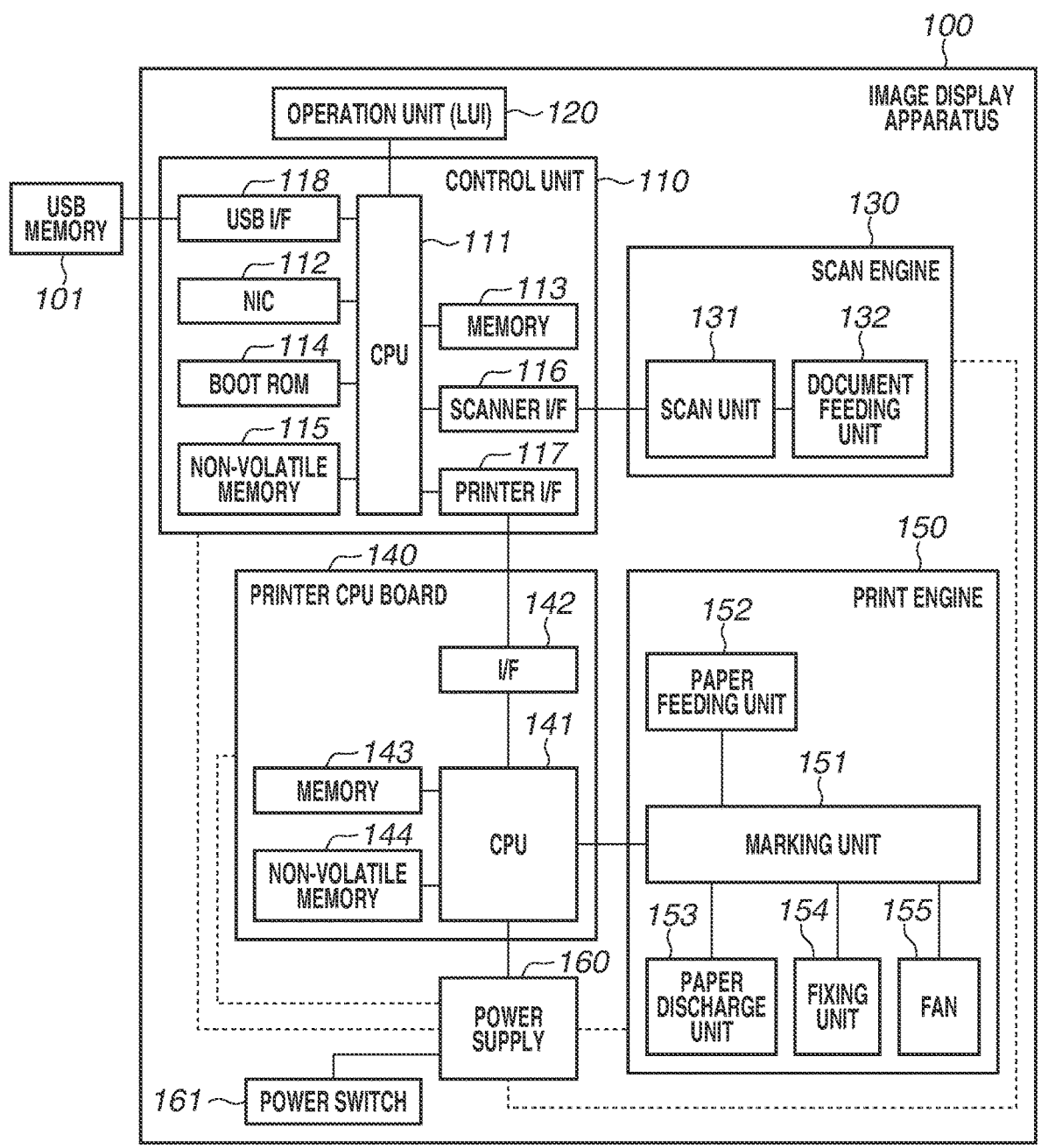
FIG. 2 is a diagram illustrating an example of a hardware configuration of an image display apparatus according to the exemplary embodiment.

FIG. 2 illustrates an example of a hardware configuration of the image display apparatus 100 according to the present exemplary embodiment. The image display apparatus 100 is what is called a multifunction peripheral (MFP), including a scan engine 130 and a print engine 150. Additionally, the image display apparatus 100 further includes a control unit 110, an operation unit 120, a printer CPU board 140, a power supply 160, and a power switch 161. The scan engine 130 includes a scan unit 131, which reads a document placed on a platen to generate image data, and a document feeding unit 132. The print engine 150 includes a marking unit 151, a paper feeding unit 152, a paper discharge unit 153, a fixing unit 154, and a fan 155 for cooling. The paper feeding unit 152 feeds sheets of paper one by one from a stack of sheets of paper placed on a paper feed stage or a paper feed tray to the marking unit 151. The marking unit 151, which is a unit configured to print an image on a sheet of paper fed from the paper feeding unit 152, performs processes of electric charging, exposure, development, and transfer. The fixing unit 154 fixes toner deposited by the marking unit 151 on a sheet of paper with use of heat and pressure. The paper discharge unit 153 discharges a sheet of paper having an image printed thereon to the outside of the image display apparatus 100.

The scan engine 130 is configured with the scan unit 131 and the document feeding unit 132. The scan unit 131 reads a document placed on the platen to perform conversion into a digital image. The document feeding unit 132 conveys documents one by one from a stack of documents placed thereon to the scan unit 131. Image data, which is digital data obtained by conversion performed by the scan unit 131, is sent to the control unit 110.

The operation unit 120 is a local user interface (LUI) used for the user to operate the image display apparatus 100. The operation unit 120 is configured with a display, which displays an image, and a touch panel, which is used to receive an input from the user. Furthermore, while, in the description of the present exemplary embodiment, the touch panel is used to receive an input from the user, another configuration can be employed to receive an input from the user. For example, the image display apparatus 100 can be equipped with hardware keys, and the hardware keys can be used to receive an input from the user.

The control unit 110 controls the operation unit 120, the scan engine 130, and the printer CPU board 140, thus executing a job. The control unit 110, which is a general-purpose central processing unit (CPU) system, includes a CPU 111, which controls the entire control unit 110, a memory 113, which the CPU 111 uses as a work memory, and a boot read-only memory (ROM) 114, in which a boot program is stored. Moreover, the control unit 110 further includes a network interface card (NIC) 112, which is used to connect to the external via a network, a USB interface (I/F) 118, and a non-volatile memory 115, which includes firmware. The non-volatile memory 115 stores icons which are used to display thumbnail images, which are described below. The USB I/F 118 is an interface used for the CPU 111 to control the USB memory 101 connected to the image display apparatus 100. Moreover, the control unit 110 is connected to the scan engine 130 and the printer CPU board 140 via a scanner I/F 116 and a printer I/F 117, respectively.

The printer CPU board 140 includes a CPU 141, which controls the entire printer CPU board 140, an interface (I/F) 142, which is connected to the printer I/F 117, a memory 143, which the CPU 141 uses a work memory, and a non-volatile memory 144. The print engine 150 is controlled by the control unit 110 via the printer CPU board 140.

Dashed lines depicted in FIG. 2 represent power-supply lines. The power supply 160 supplies electric power to the control unit 110, the scan engine 130, the printer CPU board 140, and the print engine 150. The power switch 161 is a hardware switch used to control ON/OFF of electric power supply. When the power switch 161 is turned on, the CPU 111 executes the boot program loaded on the memory 113 and performs setting of various hardware components and activation of an operating system (OS). When, after completing processing for the boot program, the CPU 111 executes programs for a controller (firmware) stored in the non-volatile memory 115, a job becomes able to be received and executed.

Figure 3:
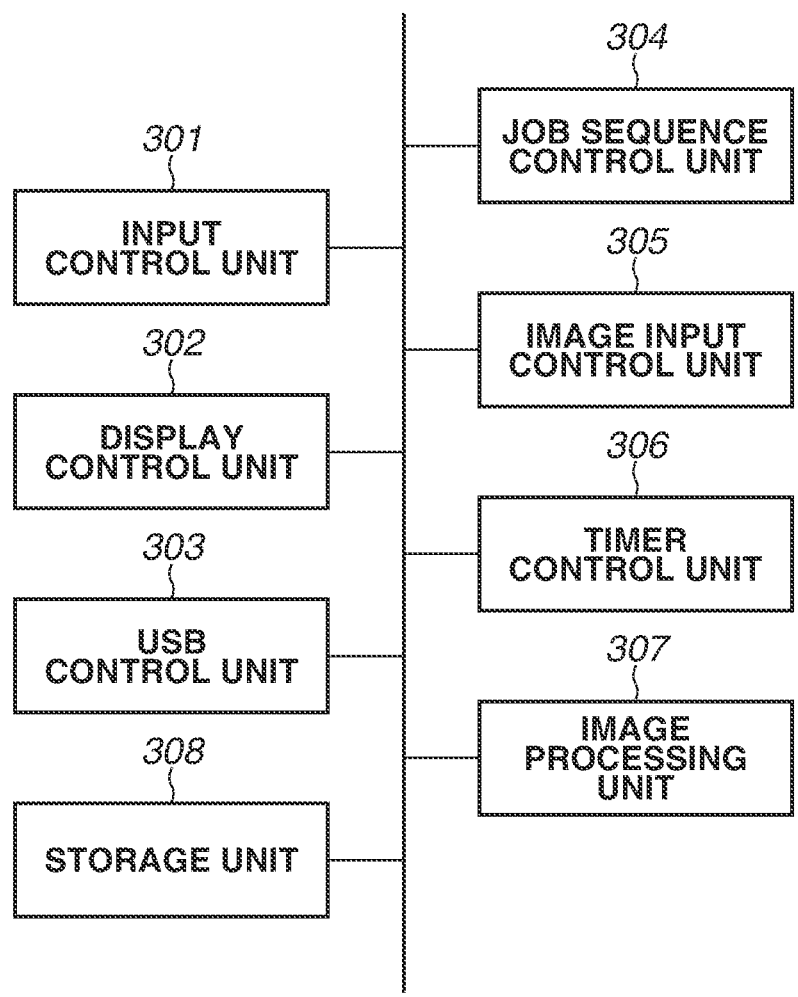
FIG. 3 is a diagram illustrating an example of a software configuration of the image display apparatus according to the exemplary embodiment.

FIG. 3 illustrates an example of a software module configuration of the image display apparatus 100 according to the present exemplary embodiment. Various functional units illustrated in FIG. 3 are implemented by the CPU 111 operating in the control unit 110 of the image display apparatus 100.

An input control unit 301 waits for inputting of an instruction from the user via the operation unit 120. In response to receiving an input from the user via the operation unit 120, the input control unit 301 communicates the received instruction to the other functional units.

A display control unit 302 displays an operation menu or an instruction result on the operation unit 120 according to an instruction issued from another functional unit.

A USB control unit 303 controls the USB I/F 118 and performs processing related to inputting or outputting of information between the image display apparatus 100 and the USB memory 101 according to an instruction issued from another functional unit.

A job sequence control unit 304 generates a job in response to an instruction communicated from the input control unit 301 or the USB control unit 303, and thus performs job processing. When performing processing, the job sequence control unit 304 controls the orders in which the respective control units operate or sends instructions for starting processing to the respective control units. Moreover, when the image display apparatus 100 is powered on, the job sequence control unit 304 issues instructions for activation processing to the other functional units.

An image input control unit 305 receives an instruction for starting a job from the job sequence control unit 304, and then performs setting of parameters indicating, for example, the size of an image required for an image processing unit 307 to perform image processing or sends an instruction for starting image processing to the image processing unit 307. For example, the image input control unit 305 reads in image data stored in the USB memory 101 via the USB control unit 303, and instructs the image processing unit 307 to process the read-in image data.

The image processing unit 307 performs image processing, such as calibration or color conversion, on image data of, for example, the Joint Photographic Experts Group (JPEG) format or page data interpreted by a page description language (PDL) processing unit (not illustrated). The image processing unit 307 generates a display image, such as a thumbnail image or a preview image, to be displayed on the operation unit 120.

A timer control unit 306 receives instructions from the various functional units and performs control related to a timer, such as generation or discard of a timer.

A storage unit 308 writes designated data to the memory 113 or the non-volatile memory 115 or reads out data stored in the memory 113 or the non-volatile memory 115 according to an instruction from another functional unit.

Figure 4:
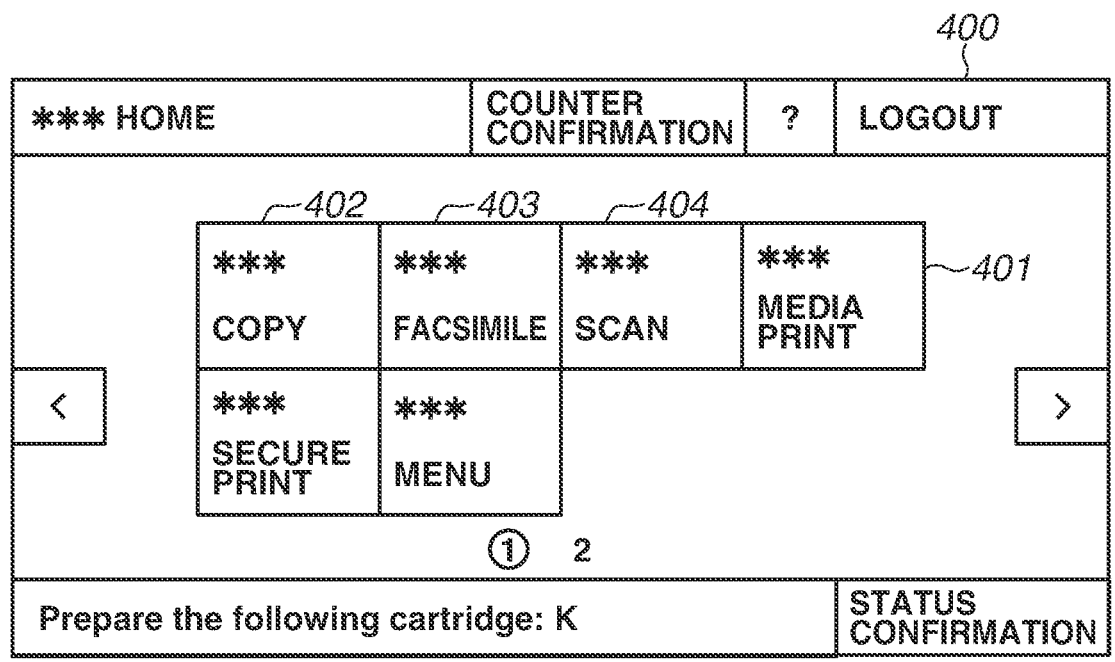
FIG. 4 is a diagram illustrating an example of a "home" screen which is displayed on an operation unit in the exemplary embodiment.

FIG. 4 illustrates an example of a "home" screen 400, which is displayed on the operation unit 120 of the image display apparatus 100 in the present exemplary embodiment. Buttons indicating functions which are able to be performed by the image display apparatus 100 (for example, copy, facsimile, scan, and media print) are displayed in the "home" screen 400. The user can perform a tap operation on a button for the function intended to be used, thus selecting which function to use.

A copy button 402 is a button operable to use a copy function. The copy function is the function of reading a document with the scan unit 131 to generate image data and then printing an image based on the image data generated by the print engine 150.

A facsimile button 403 is a button operable to use a facsimile function. The facsimile function is the function of transmitting, via facsimile, image data generated by the scan engine 130 or image data stored in the USB memory 101 connected to the image display apparatus 100 to another image display apparatus.

A scan button 404 is a button operable to use a scan function. The scan function is the function of reading, with the scan unit 131, a document placed on the platen or a document fed by the document feeding unit 132 to generate image data.

A media print button 401 is a button operable to use a media print function. The media print function is the function of displaying, on the operation unit 120, an image generated with use of image data stored in the USB memory 101 connected to the image display apparatus 100 or printing an image based on image data stored in the USB memory 101. When the user performs a tap operation on the media print button 401, information about image data stored in the USB memory 101 inserted in the image display apparatus 100 is displayed on the operation unit 120. The user selects image data intended to be printed from among file names or thumbnail images of image data displayed on the operation unit 120. After selecting image data to be printed, the user performs, for example, print setting and then instructs the image display apparatus 100 to start printing an image.

Figure 5:
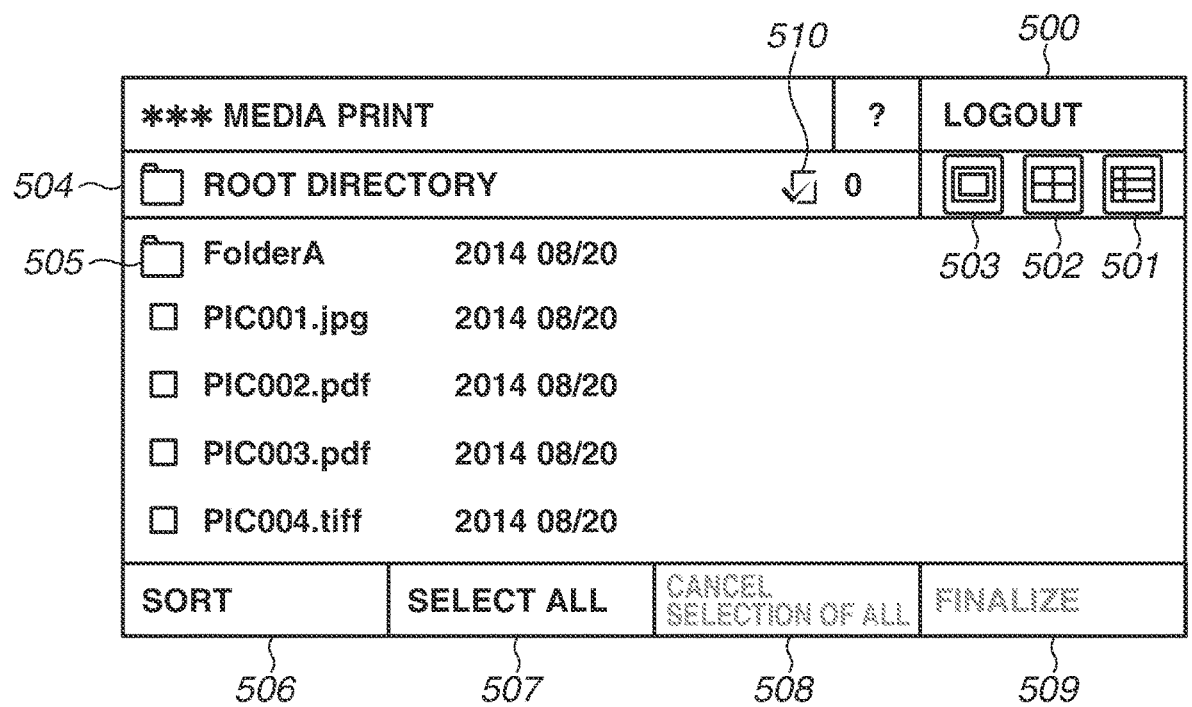
FIG. 5 is a diagram illustrating an example of a "list display" screen which is displayed on the operation unit in the exemplary embodiment.
Figure 6:
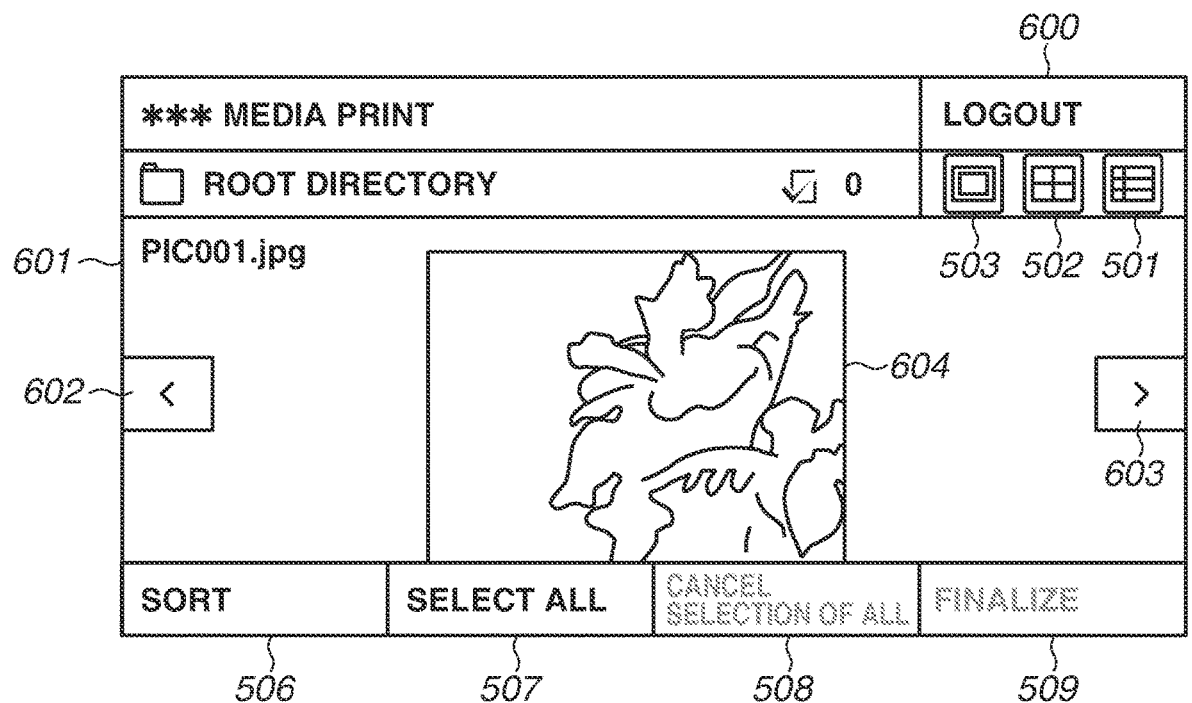
FIG. 6 is a diagram illustrating an example of a "preview display" screen which is displayed on the operation unit in the exemplary embodiment.
Figure 7:
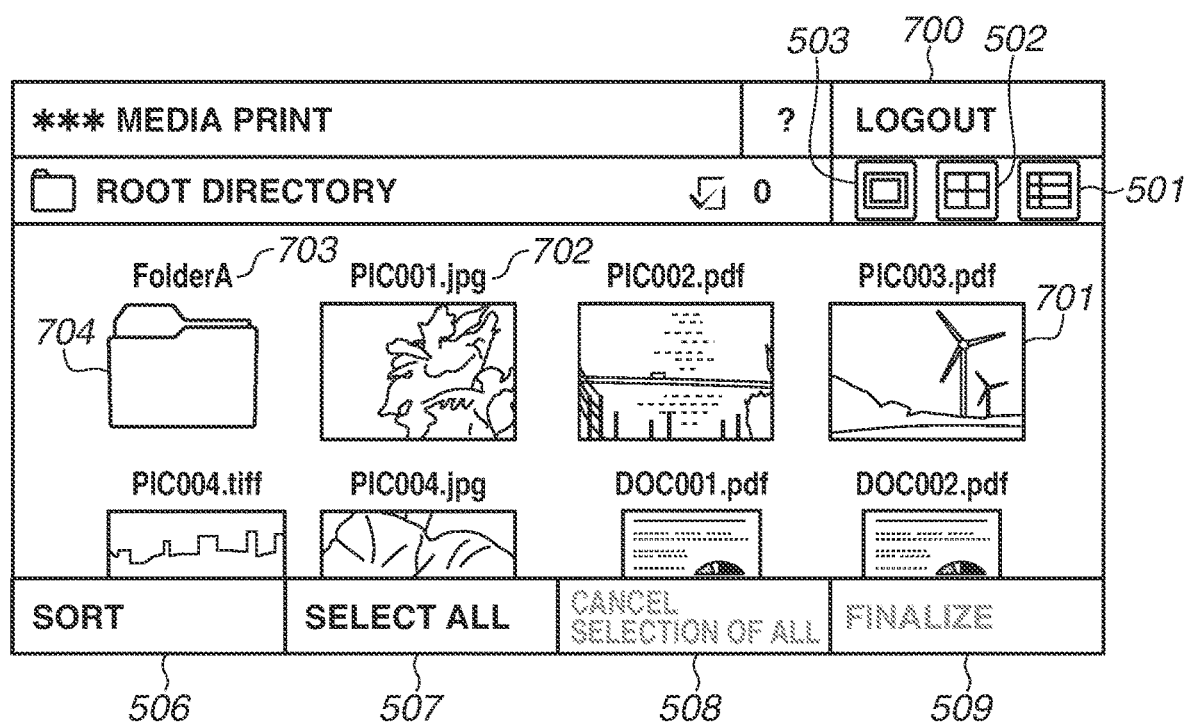
FIG. 7 is a diagram illustrating an example of a "thumbnail display" screen which is displayed on the operation unit in the exemplary embodiment.

FIG. 5, FIG. 6, and FIG. 7 each illustrate an example of a screen which is displayed on the operation unit 120 when the user performs a tap operation on the media print button 401 in the "home" screen 400. The user selects an image intended to be printed from the screen illustrated in each of FIG. 5 to FIG. 7, performs desired print setting, and issues an instruction to start printing. The screens illustrated in FIG. 5 to FIG. 7 can be selectively displayed by the user performing a tap operation on a "list display" button 501, a "preview display" button 503, and a "thumbnail display" button 502 displayed in the respective screens. The user is allowed to select image data intended to be printed via any one of the screens illustrated in FIG. 5 to FIG. 7.

In the present exemplary embodiment, in response to a tap operation being performed on the media print button 401, a "list display" screen 500 illustrated in FIG. 5 is displayed on the operation unit 120. Furthermore, a screen which is displayed on the operation unit 120 in response to a tap operation being performed on the media print button 401 can be a "preview display" screen 600 illustrated in FIG. 6 or a "thumbnail display" screen 700 illustrated in FIG. 7.

FIG. 5 illustrates the "list display" screen 500, in which pieces of image data stored in the USB memory 101 are enumerated with the respective file names. The "list display" screen 500 is displayed on the operation unit 120 in response to the user performing a tap operation on the media print button 401 in the "home" screen 400. The "list display" button 501 is a button operable to display the "list display" screen 500, in which pieces of image data stored in the USB memory 101 are displayed as a list of file names. The "thumbnail display" button 502 is a button operable to display the "thumbnail display" screen 700, in which thumbnail images of the respective pieces of image data stored in the USB memory 101 are displayed in list form. The "preview display" button 503 is a button operable to display the "preview display" screen 600, in which a preview image of image data stored in the USB memory 101 is displayed.

The name of a folder in which pieces of image data which are being displayed on the operation unit 120 are stored is displayed in a folder name display field 504. In a case where a hierarchical layer which is being displayed on the operation unit 120 is the uppermost hierarchical layer or no hierarchical layers are provided in the USB memory 101, that effect is displayed in the folder name display field 504. A folder icon 505 indicates that a folder is further included in a folder which is being displayed. For example, the folder icon 505 in the "list display" screen 500 indicates that a folder named as "FolderA" is included in the root directory. When the user performs a tap operation on the folder icon 505, pieces of image data stored in a folder of the folder icon subjected to a tap operation are displayed on the operation unit 120. When the user performs a tap operation on a file name of image data to be printed from among the displayed file names, a check mark is displayed in a checkbox displayed to the left hand of the file name, so that the corresponding image data enters a selected state. Moreover, the total number of pieces of image data in a selected state is displayed in a number-of-selected-pieces display field 510.

A "sort" button 506 is a button used to change the display sequence of file names of image data and folders which are being displayed. When the user performs a tap operation on the "sort" button 506, a menu (not illustrated) for changing the display sequence of pieces of image data is displayed on the operation unit 120. The user can permute pieces of image data, for example, in ascending order or descending order of generation date and time of image data or in ascending order or descending order of file name assigned to each piece of image data. A configuration in which the user can permute pieces of image for display in a method other than the above-mentioned method can also be employed. A "select all" button 507 is a button used to select all of the pieces of image data which are being displayed. When the user performs a tap operation on the "select all" button 507, check marks are displayed at checkboxes displayed to the left hand of file names of pieces of image data which are currently displayed, so that all of the pieces of image data enter a selected state. A "cancel selection of all" button 508 is a button used to cancel selection of all of the selected pieces of image data. When the user performs a tap operation on the "cancel selection of all" button 508, check marks which have previously been displayed at the checkboxes for the pieces of image data in a selected state disappear, and the pieces of image data which have previously been in a selected state enter a non-selected state. In a case where one or more pieces of image data are not in a selected state, the "cancel selection of all" button 508 is grayed out, so that, even when the user touches the "cancel selection of all" button 508, the image display apparatus 100 does not perform the above-described processing.

When, with one or more files selected, the user performs a tap operation on a "finalize" button 509, the screen to be displayed on the operation unit 120 transitions to a "media print setting" screen 800, which is described below.

FIG. 6 illustrates a "preview display" screen 600 for displaying a preview image which is generated from image data stored in the USB memory 101. When the user performs a tap operation on the "preview display" button 503 in the "list display" screen 500 or the "thumbnail display" screen 700, which is described below, the "preview display" screen 600 is displayed on the operation unit 120. A preview image display region 604 is a region for displaying a preview image generated by the image processing unit 307. Displaying the "preview display" screen 600 enables the user to confirm the content of each piece of image data with a preview image. The "preview display" screen 600 is effective in a case where the content of each piece of image data is not recognizable with only a file name in the "list display" screen 500 or in a case where similar images are included in the USB memory 101 and it is difficult to distinguish pieces of image data in the "thumbnail display" screen 700. In the "preview display" screen 600, a preview image larger than a thumbnail image which is displayed in the "thumbnail display" screen 700 described below is displayed.

A file name of image data the preview image of which is being displayed is displayed in a file name display region 601. When the user performs a tap operation on a button 602, a preview image of image data previous by one is displayed on the operation unit 120. Moreover, when the user performs a tap operation on a button 603, a preview image of image data next by one is displayed on the operation unit 120. The "sort" button 506, the "select all "button 507, a "cancel selection of all" button 508, and the "finalize" button 509 are similar to those in the "list display" screen 500, and are, therefore, omitted from description here. When the user performs a tap operation on a preview image displayed on the operation unit 120, image data corresponding to the preview image subjected to the tap operation is selected. When image data is selected, a preview image corresponding to the selected image data is surrounded by a frame. When the user re-performs a tap operation on the preview image which is in a selected state, the image display apparatus 100 cancels selection of the image data. While, in the present exemplary embodiment, a preview image corresponding to image data which is in a selected state is surrounded by a frame, a display method other than the method of surrounding by a frame can be employed as long as it enables recognizing that image data is in a selected state. For example, a method of changing the color of a background of a preview image corresponding to the selected image data or a method of displaying, in boldface, a file name which is displayed in the file name display region 601 can be employed.

FIG. 7 illustrates a "thumbnail display" screen 700 for displaying thumbnail images, which are display images generated from pieces of image data stored in the USB memory 101. When the user performs a tap operation on the "thumbnail display" button 502 in the "list display" screen 500 or the "preview display" screen 600, the "thumbnail display" screen 700 is displayed on the operation unit 120. The "thumbnail display" screen 700 enables the user to confirm a list of thumbnail images of pieces of image data stored in the USB memory 101. The "thumbnail display" screen 700 is effective, for example, in a case where a great number of files are stored in the USB memory 101 and the user wants to know the approximate content of each piece of image data one by one. The thumbnail image is an image smaller in size than a preview image. When the user performs a swipe operation in the up or down direction on the "thumbnail display" screen 700 which is being displayed, thumbnail images are scroll-displayed in a direction in which the swipe operation has been performed. The method of scroll-displaying thumbnail images is not limited to the above-mentioned method, and a configuration in which an arrow button is displayed in the "thumbnail display" screen 700 and scroll display is performed in response to the user performing a tap operation on the arrow button can be employed. Moreover, a configuration in which, when the user presses a hardware key (not illustrated) provided separately from the display, scroll display in the "thumbnail display" screen 700 is performed can also be employed.

Thumbnail images 701 and file names 702 are displayed in the "thumbnail display" screen 700. Moreover, in a case where a folder is included in the directory which is being displayed, the operation unit 120 displays a folder name 703 and a folder icon 704. Each thumbnail image 701 is an image smaller in size than a preview image which is displayed in the "preview display" screen 600. When, in the "thumbnail display" screen 700, the user performs a tap operation on a thumbnail image 701 of image data intended to be printed, the image data is surrounded by a frame and enters a selected state. The display method indicating a selected state is not limited to surrounding by a frame, but can be, for example, changing the color of a background of a thumbnail screen in a selected state or displaying, in boldface, the file name of image data which is in a selected state. Operations of the "sort" button 506, the "select all" button 507, the "cancel selection of all" button 508, and the "finalize" button 509 are similar to those in the "list display" screen 500, and are, therefore, omitted from description.

Figure 8:
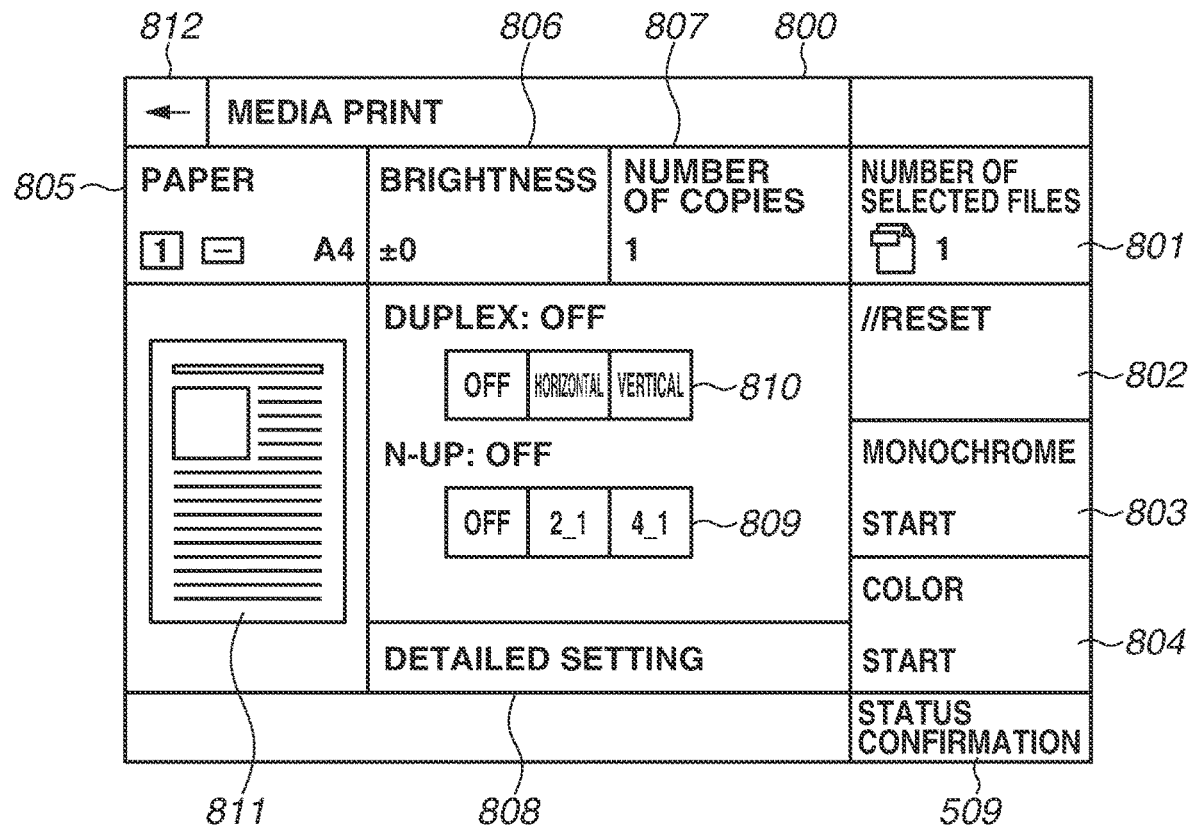

FIG. 8 illustrates an example of a "media print setting" screen 800, which is displayed on the operation unit 120 when, after selecting one or more files in each of the media print selection screens illustrated in FIG. 5 to FIG. 7, the user performs a tap operation on the "finalize" button 509.

A number-of-selected-files display region 801, which indicates the number of files of the selected pieces of image data, is indicating that one file is currently selected. A "paper setting" button 805 is a button used to set the type of paper to be used for printing of images and a paper feed stage in which the paper is contained. For example, the "paper setting" button 805 in the "media print setting" screen 800 illustrated in FIG. 8 indicates that A4 paper in the paper feed stage No. 1 is to be used for printing. The user can perform a tap operation on the "paper setting" button 805 to change paper feed stages and set a paper feed stage in which an intended paper size is set. A "brightness setting" button 806 is a button used to set the brightness of image data to be printed. In a case where the brightness is set to plus, the image display apparatus 100 prints an image in which the brightness of the selected image data has been increased. On the other hand, in a case where the brightness is set to minus, the image display apparatus 100 prints an image in which the brightness of the selected image data has been decreased.

A "number-of-copies setting" button 807 is a button used to set the number of copies for printing. When the user presses a "detailed setting" button 808, the operation unit 120 displays a "detailed setting" screen (not illustrated). The "detailed setting" screen enables the user to set, for example, a method for image processing or whether the image intended to be printed is a photo or a document. A "duplex setting" button 810 is a button used to set whether to use simplex printing (one-sided printing) or duplex printing (two-sided printing). Moreover, the "duplex setting" button 810 is also a button used to set whether to use horizontal opening or vertical opening in the case of duplex printing. An "N-up setting" button 809 is a button used to set N-up setting, such as 2 in 1. A preview region 811 displays an icon of a pictorial image of a printed product in which setting, such as duplex printing or N-up, has been performed. The pictorial image displayed in the preview region 811 illustrated in FIG. 8 is a pictorial image displayed in a case where simplex printing is used and N-up is not set. The pictorial image displayed in the preview region 811 can be a pictorial image obtained by reflecting setting performed via the "media print setting" screen in an image generated from image data selected as image data to be printed.

When the user performs a tap operation on a "reset" button 802, the image display apparatus 100 cancels settings performed by the user via the respective setting buttons and restores setting values of all of the setting items to respective default values. A "status confirmation" button 509 is a button used to display, on the operation unit 120, a status confirmation screen (not illustrated) for displaying the status of a job or the state of the image display apparatus 100.

After performing desired settings using various setting buttons, the user performs a tap operation on a "monochrome start" button 803 when wanting to perform monochrome printing or performs a tap operation on a "color start" button 804 when wanting to perform color printing. The image display apparatus 100 starts printing of the selected image data in response to a tap operation being performed on the "monochrome start" button 803 or the "color start" button 804. A "back" button 812 is a button used to end displaying of the "media print setting" screen 800 and display one of the "list display" screen 500, the "preview display" screen 600, and the "thumbnail display" screen 700 on the operation unit 120. The user can perform a tap operation on the "back" button 812 so as to re-select image data.

Here, an operation of the image display apparatus 100 performed when the "thumbnail display" screen 700 is displayed on the operation unit 120 in the present exemplary embodiment is described with reference to FIG. 9 to FIG. 11. In the present exemplary embodiment, when a thumbnail image is generated from image data of a predetermined file format, in a case where the generation of the thumbnail image is not completed even after a predetermined time has elapsed from the start of generation of the thumbnail image, an icon image is displayed instead of the thumbnail image. Here, for description, the predetermined format is assumed to be the Portable Document Format (PDF). Naturally, the predetermined format can be a file format other than PDF.

The "thumbnail display" screen 700 is displayed on the operation unit 120 according to a tap operation on the "thumbnail display" button 502 being received in the "list display" screen 500 or the "preview display" screen 600.

Figure 9:
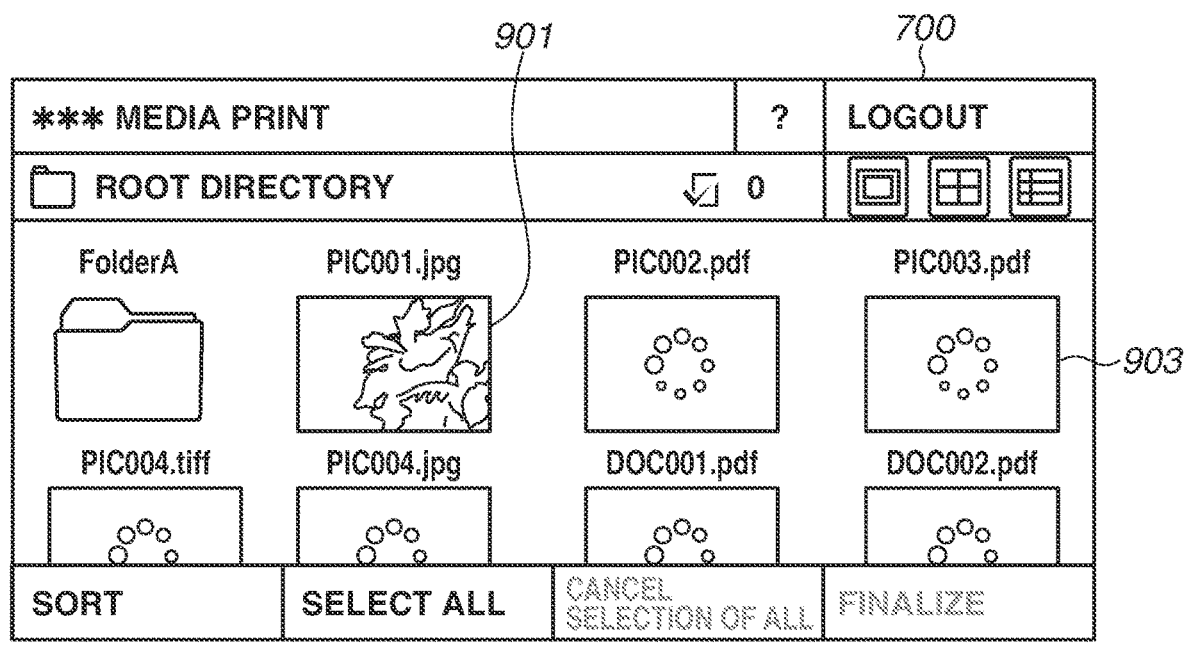
FIG. 9 is a diagram illustrating an example of a "thumbnail display" screen which is displayed on the operation unit during generation of a thumbnail image in the exemplary embodiment.

FIG. 9 illustrates an example of a thumbnail display in-process screen which is displayed on the operation unit 120 while various thumbnail images are being generated, in the "thumbnail display" screen 700. With regard to image data the generation of a thumbnail image of which is not yet completed, the operation unit 120 displays an in-process icon 903 instead of a thumbnail image in such a way as to allow the user to recognize that the generation of the thumbnail image is not yet completed. When the image processing unit 307 has completed generation of a thumbnail image, the display control unit 302 switches an image to be displayed on the operation unit 120 from the in-process icon 903 to the generated thumbnail image.

The screen illustrated in FIG. 9 is displayed on the operation unit 120 in a case where the image processing unit 307 completes generation of a thumbnail image 901 of the first image data (PIC001.jpg) and is in the process of generating a thumbnail image of the second image data (PIC002.pdf).

Figure 10:
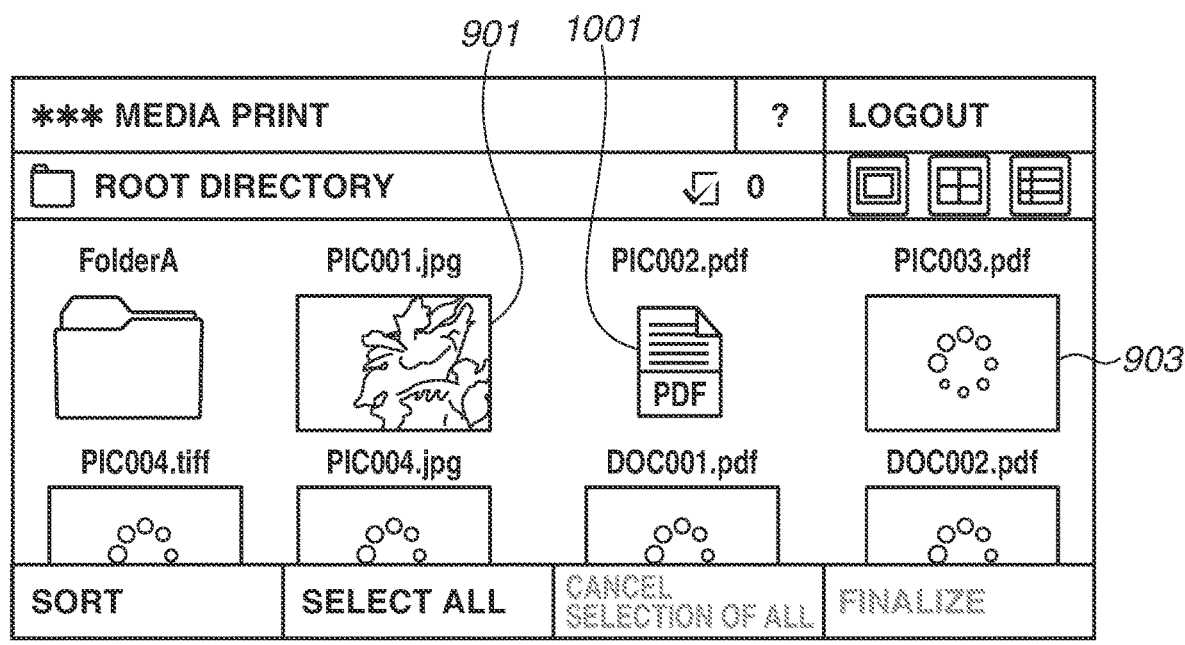
FIG. 10 is a diagram illustrating an example of a display screen in which icon images are displayed in the "thumbnail display" screen of the image display apparatus in the exemplary embodiment.

FIG. 10 illustrates a screen which is displayed on the operation unit 120 when a predetermined time has elapsed from the time when the image processing unit 307 starts generation of a thumbnail image of the second image data. In the present exemplary embodiment, for description, the predetermined time is assumed to be 5 seconds, but, naturally, the predetermined time can be longer than 5 seconds. The file format of the second image data is PDF. In a case where the generation of a thumbnail image of the second image data is not completed until 5 seconds elapses from the start of generation of the thumbnail image, the display control unit 302 displays, on the operation unit 120, an icon image 1001 instead of the thumbnail image. The icon image 1001 is previously stored in the storage unit 308. Then, the image processing unit 307 starts generation of a thumbnail image of the third image data (PIC003.pdf). In the "thumbnail display" screen 700 illustrated in FIG. 10, an in-process icon 903 is displayed at a portion corresponding to the third image a thumbnail image of which is being generated.

Figure 11:
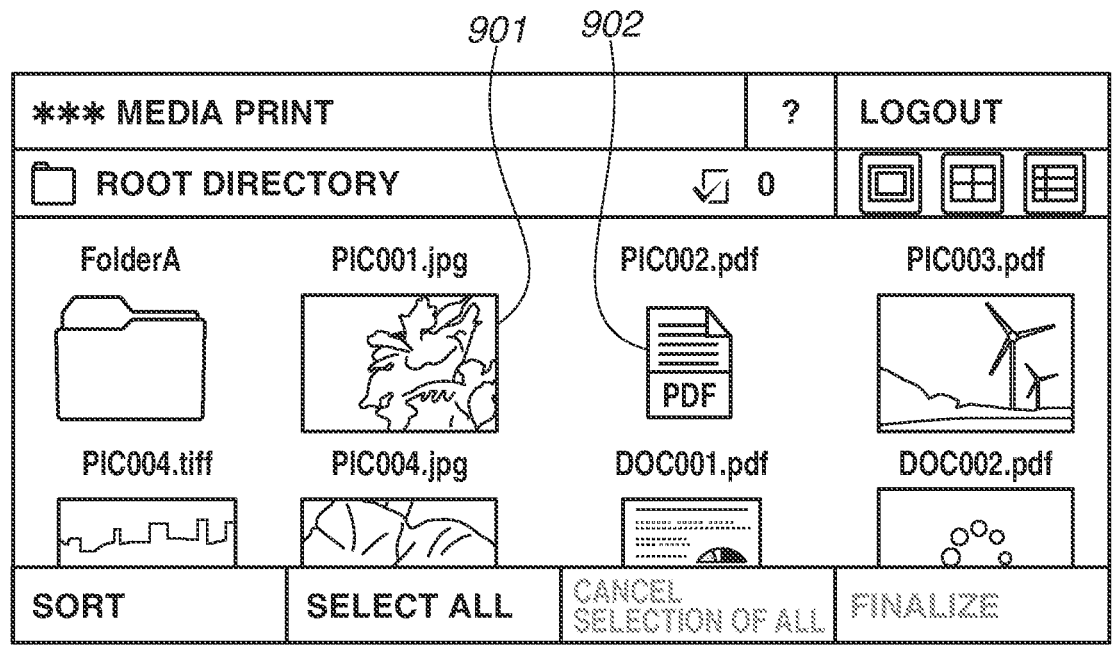
FIG. 11 is a diagram illustrating an example of a display screen which is displayed after icon images are displayed in the "thumbnail display" screen of the image display apparatus in the exemplary embodiment.

FIG. 11 illustrates a "thumbnail display" screen 700 which is displayed on the operation unit 120 after the image processing unit 307 has completed generation of thumbnail images of the third and subsequent pieces of image data. Although the third image data is of the PDF format, since the image processing unit 307 has completed generation of a thumbnail image thereof within the predetermined time, not the icon image 1001 but the generated thumbnail image is displayed. In the present exemplary embodiment, as illustrated in FIG. 11, the operation unit 120 displays, as an icon image, only image data the generation of a thumbnail image of which has not been completed even after the predetermined time has elapsed from the start of generation of the thumbnail image using image data of the predetermined format. On the other hand, with regard to image data the generation of a thumbnail image of which has been completed within the predetermined time, the operation unit 120 displays a thumbnail image generated with use of the image data.

In the present exemplary embodiment, according to a predetermined time elapsing from the time when the image display apparatus 100 starts generation of a thumbnail image using image data of a predetermined format, the image display apparatus 100 stops generation of the thumbnail image and displays an icon image. After that, the image display apparatus 100 starts generation of a thumbnail image using another piece of image data the generation of a thumbnail image of which is not yet started.

With this configuration employed, in a case where image data the generation of a thumbnail image of which has been started is image data the generation of a thumbnail image of which is time-consuming, the image display apparatus 100 can start generation of a thumbnail image using another piece of image data. In this way, without the need to wait for generation of a thumbnail image using image data the generation of a thumbnail image of which is time-consuming, the user can confirm a thumbnail image of another piece of image data.

Moreover, with regard to an image file the generation of a thumbnail image of which is not completed even after the time elapsing from the start of generation of the thumbnail image exceeds a predetermined time, the image display apparatus 100 switches displaying from the in-process icon 903 to the icon image 1001. In this way, the user can recognize that the generation of a thumbnail image has been stopped with regard to the image data, so that the user can be prevented from continuing waiting for the completion of generation of the thumbnail image.

Figure 12:
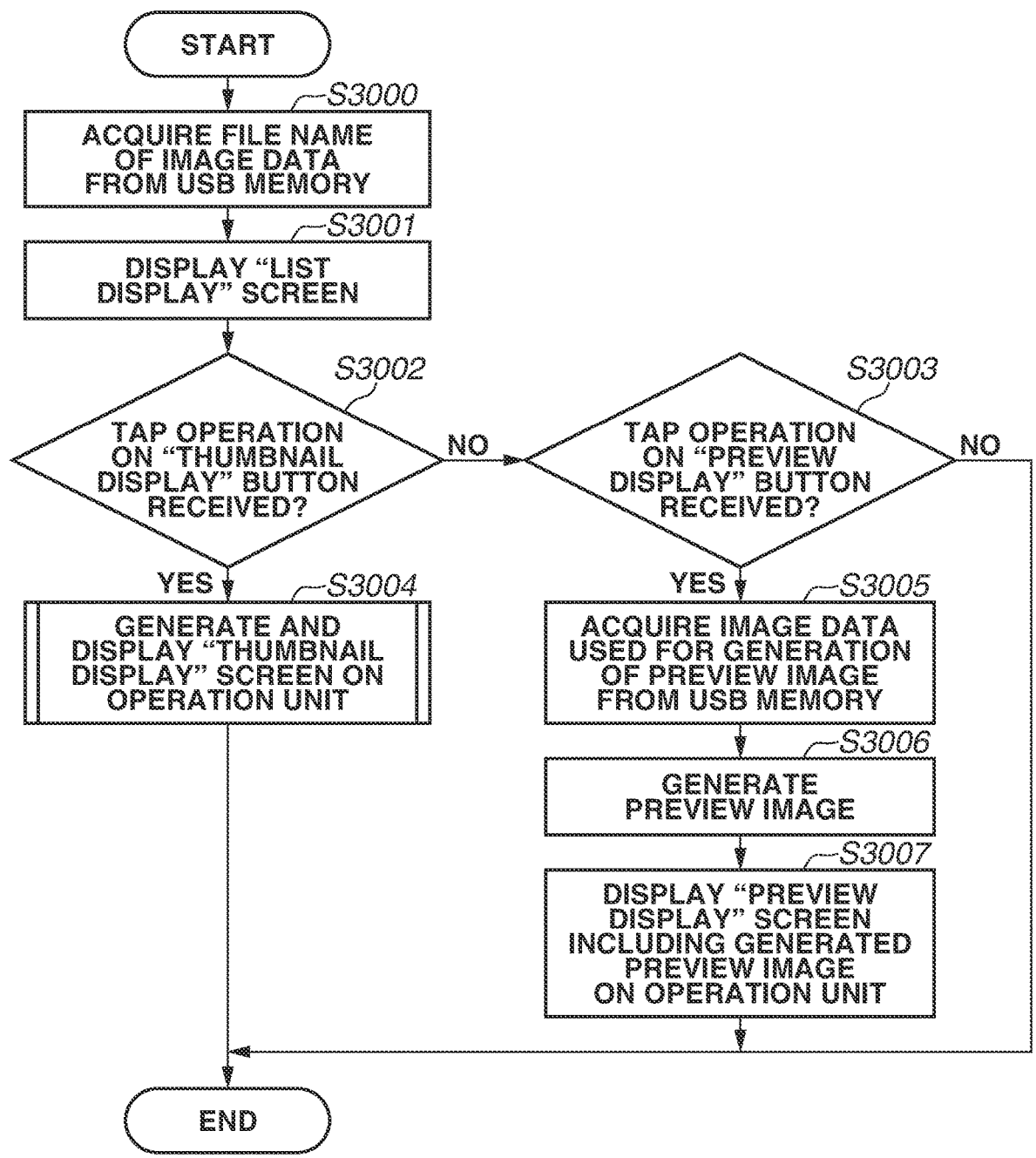
FIG. 12 is a flowchart illustrating processing which the image display apparatus performs to display the "list display" screen, the "preview image" screen, and the "thumbnail display" screen on the operation unit in the exemplary embodiment.

With reference to FIG. 12, in the present exemplary embodiment, processing performed from when a tap operation is performed on the media print button 401 to when the "list display" screen 500, the "preview display" screen 600, and the "thumbnail display" screen 700 are displayed is described. A program for performing the processing illustrated in FIG. 12 is stored in the non-volatile memory 115, and the processing illustrated in FIG. 12 is implemented by the CPU 111 executing the program.

The processing illustrated in FIG. 12 is performed in a case where the input control unit 301 has received a tap operation performed on the media print button 401 in the "home" screen 400. Moreover, the processing illustrated in FIG. 12 is also performed in a case where the input control unit 301 has received a tap operation performed on the "list display" button 501 in the "preview display" screen 600 or the "thumbnail display" screen 700.

In step S3000, the USB control unit 303 acquires a file name of image data from the USB memory 101. Then, in step S3001, the display control unit 302 generates a "list display" screen 500 for displaying file names of pieces of image data acquired by the USB control unit 303 in list form, and displays the "list display" screen 500 on the operation unit 120.

In step S3002, the input control unit 301 determines whether a tap operation on the "thumbnail display" button 502 has been received. If it is determined that a tap operation on the "thumbnail display" button 502 has been received (YES in step S3002), then in step S3004, the CPU 111 performs processing described below with reference to FIG. 13 to display the "thumbnail display" screen 700 on the operation unit 120. After the "thumbnail display" screen 700 is displayed on the operation unit 120, the CPU 111 ends the processing illustrated in the present flowchart.

If it is determined that a tap operation on the "thumbnail display" button 502 has not been received (NO in step S3002), then in step S3003, the input control unit 301 determines whether a tap operation on the "preview display" button 503 has been received. If it is determined that a tap operation on the "preview display" button 503 has been received (YES in step S3003), then in step S3005, the USB control unit 303 acquires, from the USB memory 101, image data which is used for generating a preview image to be displayed. In step S3006, the image processing unit 307 generates a preview image using the image data acquired by the USB control unit 303. In step S3007, the display control unit 302 displays, on the operation unit 120, a "preview display" screen 600 including the preview image generated by the image processing unit 307. After that, the CPU 111 ends the processing illustrated in the present flowchart.

If, in step S3003, it is determined that a tap operation on the "preview display" button 503 has not been received (NO in step S3003), the CPU 111 ends the processing illustrated in the present flowchart. At this time, the "list display" screen 500 is still displayed on the operation unit 120.

In the description performed with reference to FIG. 12, only a preview image to be displayed on the operation unit 120 is generated according to a tap operation being performed on the "preview display" button 503. However, a configuration in which, in step S3006, the image processing unit 307 generates preview images with respect to all of the pieces of image data included in a folder which is being displayed can be employed. At this time, the preview images generated by the image processing unit 307 are then stored in the storage unit 308. Then, according to a tap operation being performed on the button 602 or 603, the display control unit 302 reads out preview images stored in the storage unit 308 and displays the preview images. In this way, when an instruction to display a preview image generated from image data different from the pieces of image data of preview images which are being displayed is issued by the user, the image display apparatus 100 is able to promptly display the preview image on the operation unit 120.

Figure 13:
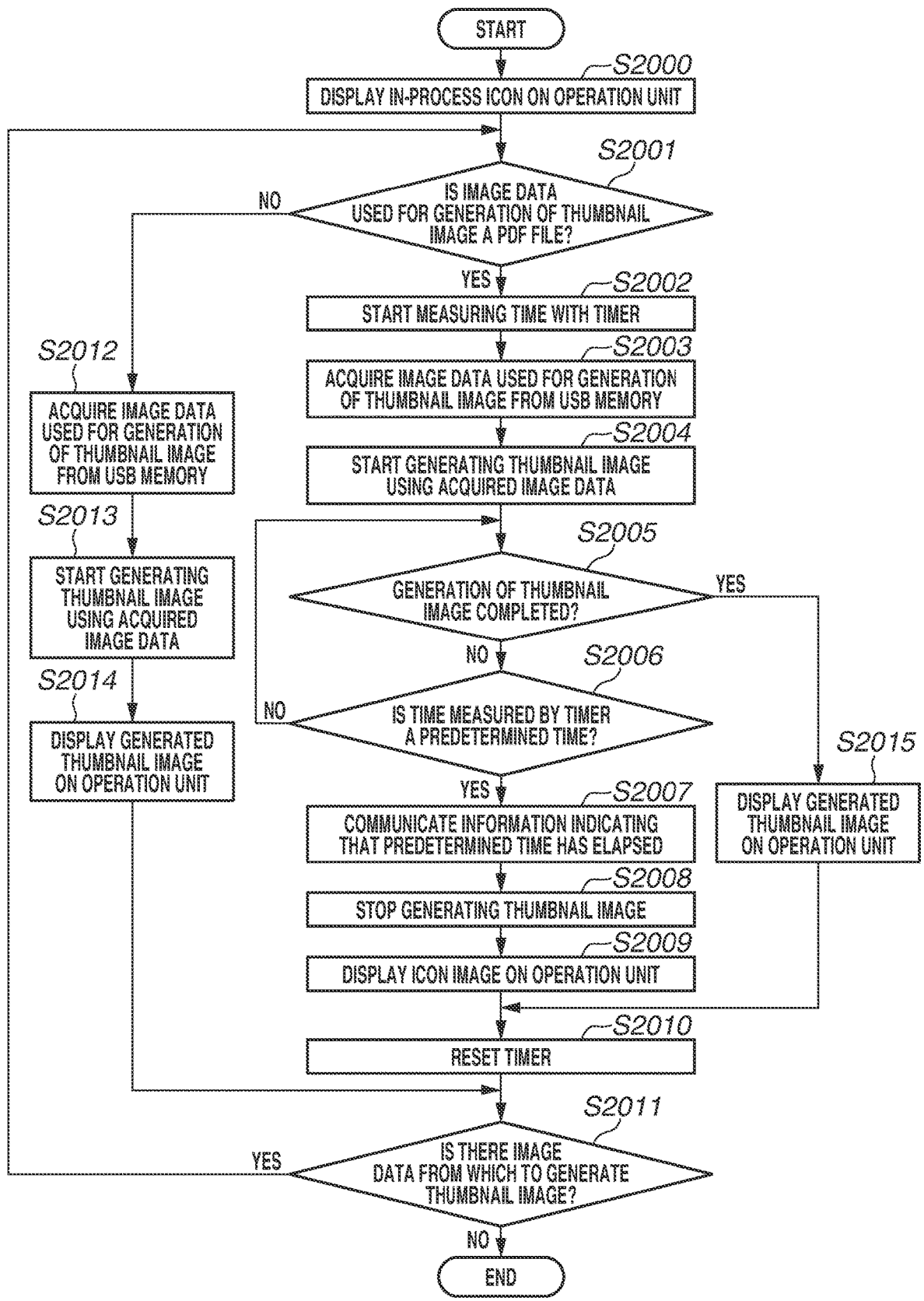
FIG. 13 is a flowchart illustrating processing which the image display apparatus performs to display thumbnail images in the exemplary embodiment.

With reference to FIG. 13, in the present exemplary embodiment, processing performed by the CPU 111 when an instruction to display the "thumbnail display" screen 700 is issued by the user is described. The processing illustrated in FIG. 13 is the details of processing which the CPU 111 performs in step S3004 illustrated in FIG. 12. The processing illustrated in FIG. 13 starts according to the input control unit 301 receiving a tap operation on the "thumbnail display" button 502 in the "list display" screen 500 or the "preview display" screen 600.

A program for performing the processing illustrated in the flowchart of FIG. 13 is stored in the non-volatile memory 115, and the processing illustrated in the present flowchart is implemented by the CPU 111 executing the program.

In step S2000, the display control unit 302 displays the in-process icon 903 on the operation unit 120. The in-process icon 903 is previously stored in the storage unit 308 in such a manner as to be able to be displayed on the operation unit 120. The display control unit 302 reads out the in-process icon 903 from the storage unit 308 and displays the in-process icon 903 on the operation unit 120.

In step S2001, the image input control unit 305 acquires the filename extension of image data to be used for generation of an image and determines whether the image data is a PDF file. More specifically, in step S2001, the USB control unit 303 acquires the filename extension of image data to be used for generation of a thumbnail image from the USB memory 101 via the USB I/F 118. The image input control unit 305 determines whether the filename extension of the image data acquired by the USB control unit 303 is PDF. While, in the present exemplary embodiment, a PDF file is taken as an example for description, if a previously-determined given format is employed, the image input control unit 305 can determine whether the filename extension is a file format other than PDF.

If it is determined that the image data to be used for generation of an image is a PDF file (YES in step S2001), then in step S2002, the timer control unit 306 starts measuring a predetermined time with a timer. While, in the present exemplary embodiment, the predetermined time is assumed to be 5 seconds for description, the predetermined time can be longer or shorter than 5 seconds. Starting time measurement with the timer in step S2002 enables measuring a time taken to generate a thumbnail image.

In step S2003, the USB control unit 303 acquires image data from the USB memory 101 connected to the USB I/F 118 of the image display apparatus 100. Then, in step S2004, the image processing unit 307 starts generating a thumbnail image having a predetermined size using the image data acquired in step S2003.

In step S2005, the image input control unit 305 determines whether the image processing unit 307 has completed generation of a thumbnail image. In a case where the image input control unit 305 has received a notification indicating that the generation of a thumbnail image has been completed from the image processing unit 307, the image input control unit 305 determines that the generation of a thumbnail image has been completed. If it is determined that the generation of a thumbnail image has been completed (YES in step S2005), then in step S2015, the display control unit 302 receives the thumbnail image generated by the image processing unit 307 and then displays the generated thumbnail image on the operation unit 120. After performing the processing in step S2015, the CPU 111 performs processing in step S2010 and subsequent steps, which are described below.

If it is determined that the generation of a thumbnail image has not been completed (NO in step S2005), then in step S2006, the timer control unit 306 determines whether the predetermined time has been measured. If the timer control unit 306 has detected that the predetermined time has elapsed from the time when the timer control unit 306 has started time measurement with the timer (YES in step S2006), the CPU 111 performs processing in step S2007 and subsequent steps. If the timer control unit 306 has not detected that the predetermined time has elapsed from the time when the timer control unit 306 has started time measurement with the timer (NO in step S2006), the CPU 111 returns the processing to step S2005.

If it is determined that the predetermined time has elapsed from the time when the time measurement with the timer has been started, then in step S2007, the timer control unit 306 communicates information indicating that the predetermined time has elapsed to the image processing unit 307. Here, the timer control unit 306 communicates time-out to the image processing unit 307. In step S2008, in response to receiving the information indicating that the predetermined time has elapsed from the timer control unit 306, the image processing unit 307 stops generating a thumbnail image. In the present exemplary embodiment, the image processing unit 307 stops generation of a thumbnail image in the process of generation and discards the thumbnail image which is in the process of being generated. In the present exemplary embodiment, such a configuration as not to discard the thumbnail image which is in the process of being generated but to store the thumbnail image which is in the process of being generated in the memory 113 can be employed.

In step S2009, the display control unit 302 acquires an icon image stored in the storage unit 308 and then displays the icon image on the operation unit 120. The icon image is previously stored in the storage unit 308 in such a manner as to be able to be displayed on the operation unit 120. Then, in step S2010, the timer control unit 306 resets the timer, which has been measuring time.

In step S2011, the image input control unit 305 determines whether there is image data from which to next generate a thumbnail image. If it is determined that there is image data from which to generate a thumbnail image (YES in step S2011), the CPU 111 returns the processing to step S2001. If it is determined that there is no image data from which to generate a thumbnail image (NO in step S2011), the CPU 111 ends the processing illustrated in FIG. 13.

If, in step S2001, it is determined that the file format of image data to be used for image generation is not PDF (NO in step S2001), then in step S2012, the USB control unit 303 acquires the image data from the USB memory 101 via the USB I/F 118. Then, in step S2013, the image processing unit 307 generates a thumbnail image using the image data acquired in step S2012. After generation of the thumbnail image is completed, in step S2014, the display control unit 302 displays the generated thumbnail image on the operation unit 120. After processing in step S2014 is completed, the CPU 111 performs processing illustrated in step S2011.

Furthermore, in the processing illustrated in FIG. 13, the time taken until time-out is communicated is set to a predetermined time. Such a configuration as to change the time taken until time-out is communicated according to the size of image data acquired via the USB control unit 303 can be employed. For example, if the size of the acquired image data is smaller than a predetermined threshold value, the timer control unit 306 shortens the time taken until time-out is communicated. Moreover, if the size of the acquired image data is larger than the predetermined threshold value, the timer control unit 306 lengthens the time taken until time-out is communicated. In this way, processing for changing the time taken until time-out is communicated according to the size of image data to be used for image generation can be performed.

In the processing illustrated in FIG. 13, in a case where the file format of image data to be used for generation of a thumbnail image is PDF, the timer control unit 306 measures time taken to generate a thumbnail image with the timer. With this configuration employed, with regard to a PDF file, which is highly likely to require a long time to generate a thumbnail image, in a case where it has taken a long time to generate a thumbnail image, the generation of the thumbnail image can be stopped and the generation of a thumbnail image using another piece of image data can be started.

On the other hand, in a case where the file format of image data to be used for generation of a thumbnail image is a file format other than PDF, such as Joint Photographic Experts Group (JPEG) or Tag Image File Format (TIFF), the timer does not measure the time taken to generate a thumbnail image. Image data of a file format other than PDF, such as JPEG or TIFF, is less likely to require a long time to generate a thumbnail image. With regard to image data of a file format other than PDF, processing for time measurement with the timer is not performed, so that processing required for a thumbnail image to be generated from image data of a file format other than PDF can be reduced.

Moreover, in a case where, even after a predetermined time has elapsed from the time when the generation of a thumbnail image using image data of a predetermined file format is started, the generation of the thumbnail image is not completed, an icon image is displayed instead of the thumbnail image. With this configuration employed, during generation of a thumbnail image, the user can know which is image data the generation of a thumbnail image of which has been switched to the generation of another thumbnail image.

Furthermore, in the present exemplary embodiment, with regard to a thumbnail image the generation of which is not completed even after a predetermined time has elapsed from the time when the generation of the thumbnail image has been started, prior to the completion of generation of the thumbnail image, the generation of a next thumbnail image is started. The moment at which to start the generation of a next thumbnail image is not limited to the above-mentioned time, but can be the time when a predetermined condition is satisfied during generation of a thumbnail image. For example, whenever performing predetermined processing during generation of a thumbnail image, the image processing unit 307 increments a counter provided in the memory 113. In step S2006, the image processing unit 307 determines whether the counter has reached a predetermined number. In response to the counter having reached the predetermined number, the image processing unit 307 stops generating the thumbnail image. With this configuration employed, with respect to image data in which the number of times of processing required for the image processing unit 307 to complete generation of a thumbnail image exceeds a predetermined number of times, the display control unit 302 displays an icon image. Then, the image processing unit 307 starts generating a thumbnail image using image data different from the prior image data. Moreover, for example, in step S2003, the image processing unit 307 estimates the time required for generation of a thumbnail image from the data size of image data acquired by the USB control unit 303. If, in step S2006, the time measured by the timer control unit 306 has become longer than the time estimated by the image processing unit 307, the image processing unit 307 can stop generation of the thumbnail image in the process of generation thereof and then start generation of another thumbnail image different from the above thumbnail image.

In the present exemplary embodiment, in a case where a predetermined condition has been satisfied during generation of an image using image data stored in the USB memory 101, the generation of a display image is stopped. Then, the image display apparatus starts generating an image using another piece of image data different from the image used for the generation of the display image stopped. With this configuration employed, in a case where the image data the generation of an image of which has been started is image data the generation of an image of which is time-consuming, the image display apparatus starts generating a display image using image data different from the image data used for generation of the prior display image.

Moreover, in the present exemplary embodiment, in the case of generation of a preview image, time-out is not provided, so that, even after a predetermined time has elapsed from the time when the generation of a preview image is started, processing is continued until the generation of the preview image is completed. With this configuration employed, a preview image can also be confirmed with regard to image data the generation of a thumbnail image of which is time-consuming and an icon image of which is thus displayed.

In the above-described way, in the present exemplary embodiment, the image display apparatus, which generates display images one by one from pieces of image data, is able to start, during generation of a prior display image, generation of a display image using image data different from image data used for generation of the prior display image.

In the present exemplary embodiment, in a case where, even after a predetermined time has elapsed from the time when the generation of a thumbnail image using image data of a predetermined file format is started, the generation of the thumbnail image is not completed, the generation of the thumbnail image is stopped. A configuration in which, after completing the processing illustrated in FIG. 13, the image display apparatus 100 re-performs generation of a thumbnail image with respect to a file the generation of a thumbnail image of which is not completed can be employed. In this instance, the image display apparatus 100 does not perform time-out processing even after a predetermined time has elapsed from the time when the generation of a thumbnail image is started, and continues processing until the generation of the thumbnail image is completed. With this configuration employed, a thumbnail image which has not been able to be generated at the time of reception of an instruction to display the "thumbnail display" screen 700 can be displayed on the operation unit 120.

In the description of the present exemplary embodiment, time-out is provided in the case of generating a thumbnail image using image data of a predetermined file format. A configuration in which time-out is provided in the case of generating a thumbnail image using not only image data of the predetermined format but also image data of any file format can be employed. For example, with regard to image data of any file format, in response to a predetermined time having elapsed from the start of generation of a thumbnail image, the generation of the thumbnail image can be stopped and, then, the generation of a next thumbnail image can be started.

In the description of the present exemplary embodiment, all of the pieces of image data stored in a memory or the USB memory 101 can be displayed on each of the "list display" screen 500, the "preview display" screen 600, and the "thumbnail display" screen 700. From among the pieces of image data stored in the memory or the USB memory 101, only pieces of image data from which the image display apparatus 100 is able to generate images can be set as targets for displaying. For example, the image display apparatus 100 is assumed to be able to print only pieces of image data of the JPEG, TIFF, and PDL formats. In this instance, the image display apparatus 100 does not display pieces of image data of file formats other than the above three formats on the "list display" screen 500, the "preview display" screen 600, or the "thumbnail display" screen 700. With this configuration employed, pieces of image data which the image display apparatus 100 is unable to print can be prevented from being displayed on the operation unit 120.

In the description of the present exemplary embodiment, in the case of displaying a preview image, one preview image is displayed for each screen. A configuration in which a plurality of preview images is displayed for each screen can be employed. In this instance, when generating a plurality of preview images to be displayed at a time, the image input control unit 305 can perform the processing illustrated in FIG. 13. With this configuration employed, in a case where the image display apparatus 100 concurrently displays a plurality of preview images, even if image data the generation of a preview image of which is time-consuming is included, the image display apparatus 100 can start generating a preview image of another piece of image data.

In the present exemplary embodiment, the image display apparatus 100 communicates time-out in the case of generating a thumbnail image from image data read out of the USB memory 101. On the other hand, a configuration in which the image display apparatus 100 does not communicate time-out in the case of generating a thumbnail image from image data stored in the memory 113 or the non-volatile memory 115 included in the image display apparatus 100 can be employed. Image data stored in the memory 113 or the non-volatile memory 115 of the image display apparatus 100 is image data generated from a document read by the scan unit 131. The generation of a thumbnail image of the image data generated from a document read by the scan unit 131 is less likely to be time-consuming. Therefore, time-out is not provided in the case of generating a thumbnail image from image data stored in the memory 113 or the non-volatile memory 115 included in the image display apparatus 100, so that processing required for generation of a thumbnail image can be reduced.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions or operations of one or more of the above-described embodiment(s) and/or that includes one or more circuits (e.g., application specific integrated circuit (ASIC)) for performing the functions or operations of one or more of the above-described embodiment(s), and by a method or operations performed by the computer of the system or apparatus by, for example, reading out and executing the computer executable instructions from the storage medium to perform the functions or operations of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-142968, filed Jul. 24, 2017, which is hereby incorporated by reference herein in its entirety.

What is claimed is:

1. An image display apparatus comprising:
    a generation unit configured to execute a generation process of a display image based on an image file;
    a display unit configured to display the display image generated by the generation unit; and
    a control unit configure to cause, in a case that the generation process of a first display image based on a first image file a file format of which is a predetermined file format is not finished within a predetermined time since the generation process of the first display image had started, the generation unit to start the generation process of another display image based on another image file, and not to cause, in a case that the generation process of a second display image based on a second image file a file format of which is another predetermined file format different from the predetermined file format is not finished within the predetermined time since the generation process of the second display image had started, the generation unit to start the generation process of another display image based on another image file.

2. The image display apparatus according to claim 1, wherein the display unit displays an icon image indicating the first image file, in a case that the generation process of the first display image is not finished within the predetermined time.

3. The image display apparatus according to claim 2, wherein the icon image is an icon image indicating the file format of the first image file.

4. The image display apparatus according to claim 1, wherein the control unit is configured to, in a case that the generation process of the first display image is not finished within the predetermined time, cause the generation unit to stop the generation process of the first display image.

5. The image display apparatus according to claim 1,
    wherein the generation unit is configured to continue the generation process of the second display image based on the second image file, in a case that the generation process of the second display image is not finished within the predetermined time.

6. The image display apparatus according to claim 5, further comprising:
    a determination unit configured to, based on a file name, determine whether a file format of an image file is the predetermined file format.

7. The image display apparatus according to claim 1, wherein the predetermined file format is Portable Document Format (PDF).

8. The image display apparatus according to claim 1,
    wherein the image display apparatus is attachable to a storage device, and
    wherein the first image data and the second image data are image data stored in a storage attached to the image display apparatus.

9. The image display apparatus according to claim 1, further comprising:
    a printing unit configured to print an image on paper,
    wherein the printing unit prints an image generated based on the first image data.

10. The image display apparatus according to claim 1, wherein the display unit is able to selectively display a first screen used to display file names of pieces of image data in list form, a second screen used to display one display image, and a third screen used to display a plurality of display images generated by the generation unit on one screen.

11. The image display apparatus according to claim 10, wherein the generation unit is configured to, in a case that the display unit displays the second screen, execute the generation process of the another display image based on the first image file until the another display image is able to be displayed.

12. The image display apparatus according to claim 1, wherein the generation unit generates the first display image based on an initial page of the first image file.

13. The image display apparatus according to claim 1,
    wherein the generation unit starts to generate another display image without receiving an operation from a user based on the predetermined time having elapsed from the start of the generation of the first display image.

14. The image display apparatus according to claim 1,
    wherein an extension of the first image file is a predetermined extension, and
    wherein an extension of the second image file is not the predetermined extension.

15. The image display apparatus according to claim 1,
    wherein an extension of the first image file is a predetermined extension, and
    wherein the generation unit is configured to continue the generation process of the second display image based on the second image file, of which an extension is differ from the predetermined extension, in a case that the generation process of the second display image based on the second image file is not finished within the predetermined time since the generation process of the second display image had started.

16. The image display apparatus according to claim 1, wherein the first image file is an image file in a command format.

17. The image display apparatus according to claim 16, wherein the second image file is an image file in a format different from the command format, and
wherein the generation unit is configured to continue the generation process of the second display image, in a case that the generation process of the second display image based on the second image file is not finished within the predetermined time since the generation process of the second display image had started.

18. The image display apparatus according to claim 1, wherein another predetermined file format different from the predetermined file format is JPEG or TIFF.

19. A control method for an image display apparatus, the control method comprising:
executing a generation process of a display image based on an image file by a generation unit;
displaying the generated display image as a list of the pieces of image data; and
causing, in a case that the generation process of a first display image based on a first image file a file format of which is a predetermined file format is not finished within a predetermined time since the generation process of the first display image had started, the generation unit to start the generation process of another display image based on another image file, and not to cause, in a case that the generation process of a second display image based on a second image file a file format of which is another predetermined file format different from the predetermined file format is not finished within the predetermined time since the generation process of the second display image had started, the generation unit to start the generation process of another display image based on another image file.

20. An information processing apparatus comprising:
a generation unit configured to generate a display image based on a file in a first format or a file in a second file format; and
a display unit configured to display the generated display image,
wherein the generation unit (1)starts, based on completion of the generation of a display image based on a file in the first format regardless of processing time for generating the display image based on the file in the first format, to generate another display image based on another file, (2)starts, in a case that the processing unit completes the generation of a first display image based on a first file in the second format, to generate another display image based on another file, (3)stops, in a case that the processing unit does not complete the generation of a second display image based on a second file in the second format in a predetermined period, the generation of the display image based on the file in the second format and starts to generate another display image based on another file.

* * * * *